Patented May 20, 1952

2,597,370

UNITED STATES PATENT OFFICE 2,597,370

CEMENT LINING FOR METAL PIPE

Arnold L. Peckman, McKeesport, Pa., assignor to United States Steel Company, a corporation of New Jersey No Drawing. Application April 2, 1948,
Serial No. 18,728

2 Claims. (Cl. 106—97)

This invention relates to cement and more particularly to cement which may be utilized for lining metal pipe, tanks, containers or the like used for handling corrosive waters and solutions.

When metal pipe or containers are used for water or solutions containing corrosive elements, it has been found necessary to provide the inner walls of the pipe or container with a protective coating or lining to insure against failure due to corrosion. Because of its protective qualities and the ease with which it may be applied, a cement is most generally used for this lining. Previous to my invention, the cement most commonly used for this purpose was composed of a mixture having cupola furnace slag as its principal ingredient in combination with Portland cement and gypsum. Although this mixture resulted in a cement having the desired properties, its use has become uneconomical due to its high cost of manufacture, which may be attributed directly to the decreasing supply or availability of cupola furnace slag. This has necessitated the development of a cement suitable for lining purposes which does not require the use of cupola slag.

It is, therefore, an object of my invention to provide a cement possessed of physical and chemical characteristics which make it suitable for use as a protective lining in metal pipe, tanks, containers or the like.

It is another object of my invention to provide a cement suitable for lining purposes which does not require the use of cupola slag in its manufacture.

It is a further object of my invention to provide a cement suitable for lining purposes that can be cheaply manufactured from readily available raw materials.

These and other objects will become more apparent after referring to the following specification.

The primary requisite of a cement suitable as a lining for the interior of a steel pipe section or container is low solubility. It is well known to those versed in the art that in order to obtain a low soluble cement it is necessary, among other things, to keep its content of calcium oxide down to a minimum. For this reason cupola slag, which is low in calcium oxide, is used as a principal ingredient of lining cement. It is also on this account that the use of regular blast furnace slag, which is high in calcium oxide content, has been carefully avoided although it is cheaper and more abundant than cupola slag. However, I have found that blast furnace slag may be used in the manufacture of a cement suitable for lining, if used in proper proportions with sand, gypsum, and freshly ground Portland cement.

A lining cement superior in quality to cupola slag cement is produced by combining the above ingredients in the following proportions:

| | Per cent |
|---|---|
| Granulated blast furnace slag | 48.00–49.50 |
| Freshly ground Portland cement | 33.00–34.00 |
| Clean river sand | 16.00–18.00 |
| Gypsum | 1.40– 1.70 |

Any omission or substitution of one or more of the above ingredients produces unsatisfactory results.

I have found the following specific mixture preferable.

| | Per cent |
|---|---|
| Granulated blast furnace slag | 48.50 |
| Freshly ground Portland cement | 33.00 |
| Clean river sand | 17.00 |
| Gypsum | 1.50 |

All of the percentages stated are based on weight.

The above mixtures are preferably ground to permit at least 94.00% thereof to pass through a 230-mesh screen.

When the cement of my invention is mixed with water to form a paste, applied, and cured in the conventional manner, it results in a lining of compactness, with an absence of undesirable physical characteristics such as stratification, segregation, ridges, corrugations, perforations, and depressions. The resultant lining has high strength, good machinability, low solubility in acid waters, and low shrinkage.

The coefficient of expansion of the cement lining of my invention is the same at that of steel so that when it is used with steel pipe, tanks, containers or the like, it will not fracture or crumble under high temperature operating conditions.

While one embodiment of my invention has been shown and described, it will be apparent that other adaptations and modifications may be made without departing from the scope of the following claims.

I claim:

1. A low-soluble cement for lining steel pipe having the composition consisting of 48.50% by weight blast furnace slag, 33.00% by weight Portland cement, 17.00% by weight river sand, and 1.50% by weight gypsum.

2. A low-soluble cement for lining steel pipe having a composition consisting of 48.00% to 49.50% by weight blast furnace slag, 33.00% to 34.00% by weight Portland cement, 16.00% to 17.00% by weight river sand, and 1.40% to 1.70% by weight gypsum.

ARNOLD L. PECKMAN.

REFERENCES CITED

The following references are of record in the file of this patent:

UNITED STATES PATENTS

| Number | Name | Date |
|---|---|---|
| 85,713 | Westermayer | Jan. 5, 1879 |
| 770,557 | Brunson | Sept. 20, 1904 |
| 1,020,124 | Brown | Mar. 12, 1912 |
| 1,748,839 | Grunewald | Feb. 25, 1930 |
| 1,916,157 | Chappell | June 27, 1933 |
| 2,308,307 | Robinson | Jan. 12, 1943 |

FOREIGN PATENTS

| Number | Country | Date |
|---|---|---|
| 12,621 | Great Britain | 1906 |
| 203,937 | Great Britain | 1923 |
| 500,203 | Great Britain | 1939 |

OTHER REFERENCES

Eckel: Cements, Limes and Plasters, 3rd ed., 1928, John Wiley, New York, page 620.

Lea & Desch: The Chemistry of Cement and Concrete, 1935, E. Arnold, London, page 285.